(12) United States Patent
Brost

(10) Patent No.: US 7,607,362 B1
(45) Date of Patent: Oct. 27, 2009

(54) FLOWMETER AND A USE THEREOF FOR MEASURING FLUID FLOW INDEPENDENTLY OF FLUID'S STATE PROPERTY

(75) Inventor: Ronald David Brost, Dearborn, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 12/124,705

(22) Filed: May 21, 2008

(51) Int. Cl.
G01F 1/05 (2006.01)
G01F 5/00 (2006.01)

(52) U.S. Cl. .................. 73/861.79; 73/202
(58) Field of Classification Search ............ None
See application file for complete search history.

(56) References Cited

U.S. PATENT DOCUMENTS

| | | | |
|---|---|---|---|
| 2,519,378 A | 8/1950 | Kilpatrick | |
| 2,660,886 A * | 12/1953 | Milmore | 73/862 |
| 3,550,426 A * | 12/1970 | Griffo | 73/1.35 |
| 3,613,450 A | 10/1971 | Bodge | |
| 3,735,637 A | 5/1973 | Penet | |
| 3,990,305 A | 11/1976 | Wallman | |
| 4,030,357 A * | 6/1977 | Wemyss | 73/202 |
| 4,468,972 A | 9/1984 | Fisher et al. | |
| 4,523,479 A | 6/1985 | Johnson | |
| 4,842,806 A | 6/1989 | Ohtomi | |
| 4,885,943 A * | 12/1989 | Tootell et al. | 73/861.77 |
| 5,540,107 A | 7/1996 | Silverman et al. | |
| 5,554,805 A * | 9/1996 | Bahrton | 73/202 |
| 5,876,610 A | 3/1999 | Clack et al. | |
| 7,426,875 B1 * | 9/2008 | McMillan | 73/861.79 |

FOREIGN PATENT DOCUMENTS

JP 8201130 8/1996

* cited by examiner

*Primary Examiner*—Harshad Patel
(74) *Attorney, Agent, or Firm*—Damian Porcari; Brooks Kushman P.C.

(57) ABSTRACT

The present invention relates to a flowmeter for measuring flow rate of a fluid independently of fluid viscosity or density. In at least on embodiment, the flowmeter includes an inlet, an outlet, and a cylindrical chamber. The flowmeter also includes an impeller assembly positioned within a cylindrical chamber for rotation at a variable speed. In at least one embodiment, the flow rate of the fluid is determined when a pressure differential between the fluid in the let and fluid in the outlet becomes substantially zero.

20 Claims, 2 Drawing Sheets

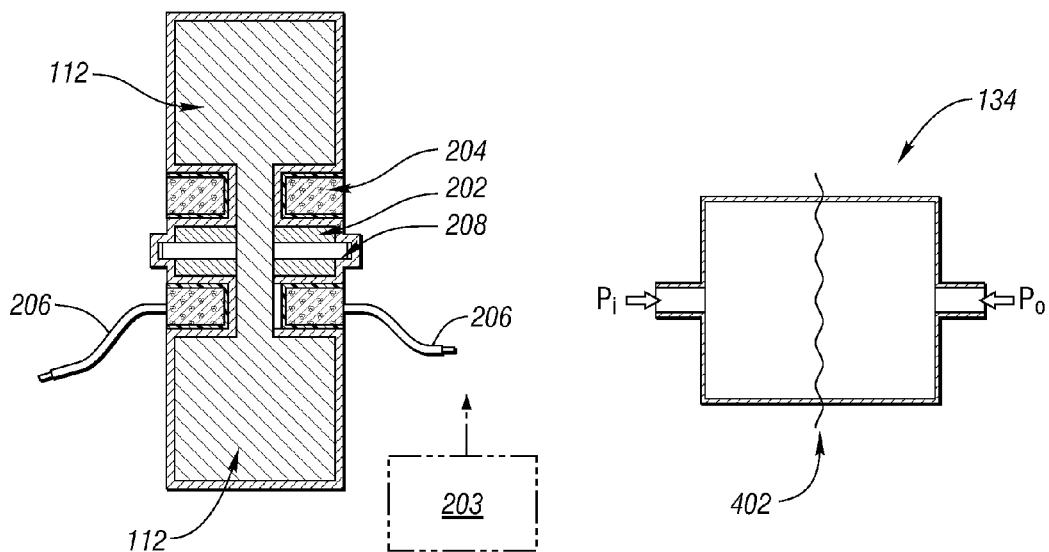
*Fig. 2*
*Fig. 4*
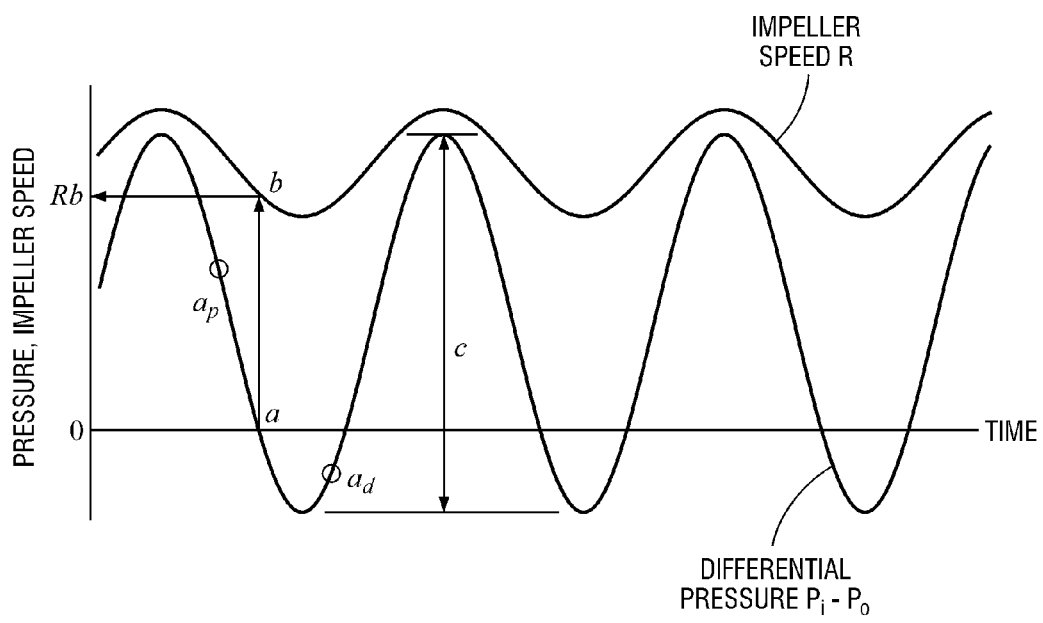
*Fig. 3*

US 7,607,362 B1

FLOWMETER AND A USE THEREOF FOR MEASURING FLUID FLOW INDEPENDENTLY OF FLUID'S STATE PROPERTY

BACKGROUND OF THE INVENTION

1. Field of the Invention

The embodiments of the present invention relate to measuring flow rate of a fluid.

2. Background Art

Flow rate of a fluid such as a liquid or a gas is measurable through the use of a flowmeter. Several types of conventional flowmeters are known in the art. A first conventional flowmeter includes a piston meter which is used for domestic water measurement. The piston flowmeter operates through a piston regularly rotating within a chamber of known volume. For each rotation, a certain amount of water passes through the piston chamber. Another conventional mechanical flowmeter includes a turbine flow meter. In operation, a turbine wheel is generally set at a constant speed within a fluid. Seals are often required to maintain the integrity of components that are in direct contact with the movement of fluid. As such, it has been a concern in how best to reduce maintenance costs associated with the use of a turbine flowmeter. Yet another conventional mechanical flowmeter includes a thermal mass flowmeter. The thermal mass flowmeter uses combinations of heated elements and temperature sensors to measure flow rate of a fluid. While providing a flow readout, the thermal flowmeter often needs to be calibrated at least with regard to the heat capacity of the fluid, thermal sensors, and other related structural elements.

Conventional flowmeters have met with limited use when a fluid to be measured is one having at least one state property such as viscosity or density that is either low in content or changing over time. By way of example, the turbine flowmeters rely on a constant or known fluid viscosity and density for calibration. As such, the turbine flowmeters are rendered lack of value for measuring flow rate of fluids with changing state properties. Other conventional flowmeters such as the piston type flowmeters substantially dependent on the use of moving seal while moving seals are known to possess low reliability and cause unwanted operational interruptions. Further, differential temperature techniques depend on a known fluid composition and often becomes less suitable when the composition of a measured fluid changes during operation.

SUMMARY OF THE INVENTION

According to at least one aspect of the present invention, a flowmeter measuring flow rate of a fluid having a plurality of state properties is provided. In at least on embodiment, the flowmeter includes a housing conduit having an inlet, an outlet, and a cylindrical chamber, the cylindrical chamber being interposed between the inlet and the outlet. The flowmeter also includes an impeller assembly positioned within the cylindrical chamber for rotation within the cylindrical chamber, wherein the impeller assembly is operably coupled to a controller to facilitate rotational movement of the impeller assembly at a variable speed such that a pressure differential of the fluid between the inlet and the outlet varies between a first value and a second value. The flowmeter further includes a pressure sensor fluidly coupled to the housing conduit and configured to measure the pressure differential. The flow rate of the fluid is determined, independently of at least one of the state properties, when the pressure differential is at a pre-selected pressure value that is between the first pressure value and the second pressure value. In at least one particular embodiment, the pre-selected pressure value is substantially zero.

BRIEF DESCRIPTION OF THE DRAWINGS

FIG. 2 is a cross-sectional view of an impeller assembly within the flowmeter of FIG. 1;

FIG. 3 schematically depicts profiles of changes, over time, of both an impeller speed and a pressure differential; and FIG. 4 illustrates a two sided differential pressure sensor applicable to the flowmeter of FIG. 1.

DETAILED DESCRIPTION OF THE PREFERRED EMBODIMENT(S)

Figure 1:
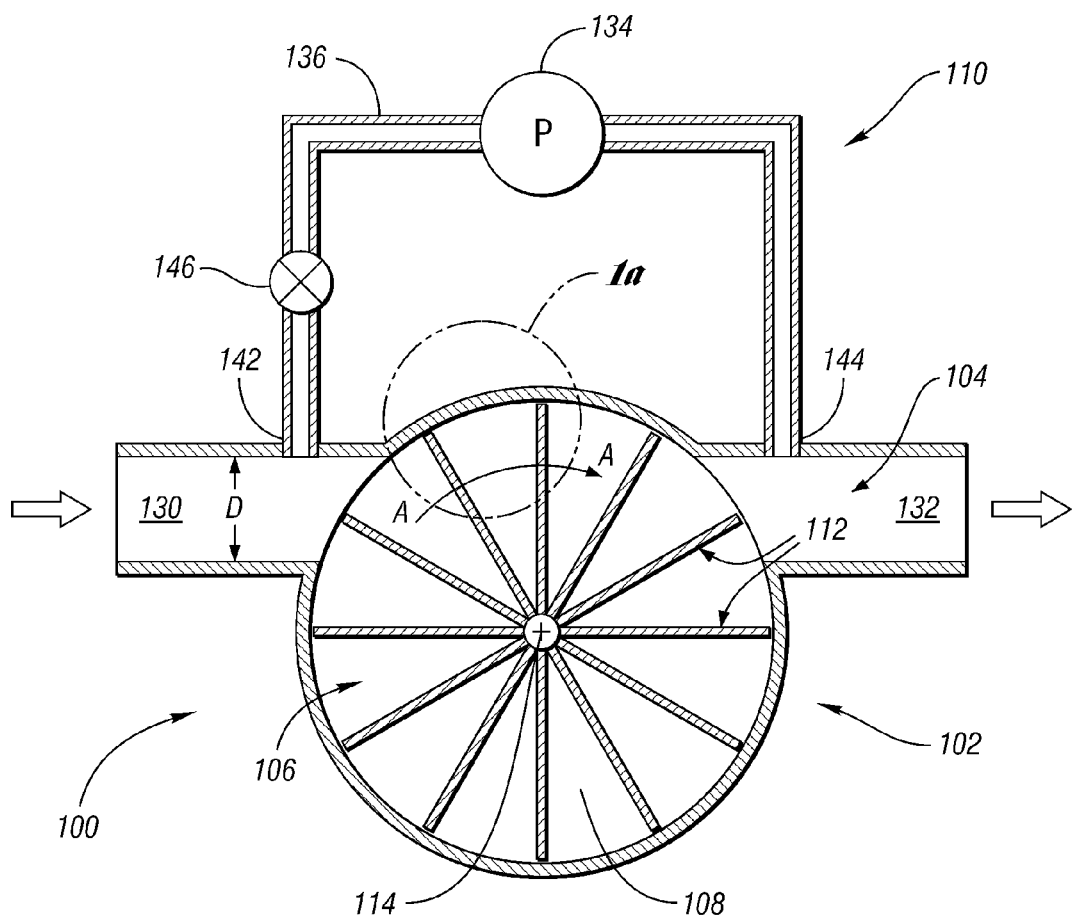
FIG. 1 schematically depicts a flowmeter in accordance with at least one embodiment of the present invention.

As required, detailed embodiments of the present invention are disclosed herein. However, it is to be understood that the disclosed embodiments are merely exemplary of the invention that may be embodied in various and alternative forms. The figures are not necessarily to scale, some feature may be exaggerated or minimized to show details of particular components. Therefore, specific structural and functional details disclosed herein are not to be interpreted as limiting, but merely as a representative basis for the claims and/or a representative basis for teaching one skilled in the art to variously employ the present invention.

Moreover, except where otherwise expressly indicated, all numerical quantities in the description and in the claims are to be understood as modified by the word "about" in describing the broader scope of this invention. Practice within the numerical limits stated is generally preferred. Also, unless expressly stated to the contrary, the description of a group or class of material as suitable or preferred for a given purpose in connection with the invention implies that mixtures of any two or more members of the group or class may be equally suitable or preferred.

According to at least one aspect of the present invention, a flowmeter is provided. The flowmeter is capable of measuring flow rate of a fluid independently of a state property of the fluid. In at least one embodiment, the flowmeter may be used in connection with a fuel cell based vehicle for measuring the flow rate of hydrogen. However, it should be understood that the principles of the embodiments of the present invention are applicable to measuring the fluid flow rate for additional applications such as water meters, oil pumps, engine pipes or any other such apparatus that is generally situated to measure the fluid flow rate of a fluid.

As used herein and unless otherwise identified, the term "fluid" refers to a liquid with or without solid particles, a gas with or without solid particles, or any combinations thereof.

As used herein and unless otherwise identified, the term "state property" of a fluid illustratively includes fluid temperature, fluid pressure, concentration of particle species contained within the fluid, fluid viscosity, and fluid density. It is noted that fluid viscosity and density are each a function of state properties including fluid temperature, fluid pressure, and/or concentration of particle species contained within the fluid.

Viscosity is generally defined as a measure of the resistance of a fluid to being deformed by either shear stress or extensional stress. The viscosity of hydrogen is accepted at a value around $8.4 \times 10^{-6}$ [Pa·s]; likewise, the viscosity for air is around $17.4 \times 10^{-6}$ [Pa·s].

As used herein and unless otherwise identified, the term "substantially zero" refers to a pressure differential of a fluid between an inlet and an outlet of an flowmeter according to at least one embodiment of the present invention. Under theoretically perfect measuring conditions, substantially zero pressure differential is meant to be an absolute zero. Yet it is intended that the substantially zero also refers to reasonable variations to the absolute zero due to variations or tolerances generally associated with measuring devices. Substantially zero may also correspond to a value that is considered to be zero by employing any statistical based method or algorithm.

Referring now to the Figures, where like numerals are used to designate like structures throughout the drawings, a schematic flowmeter is generally shown at 100 in FIG. 1. The flowmeter 100 includes a housing conduit 102 and a pressure sensing component 110. The housing conduit 102 is further composed of a pipe portion 104 and a cylindrical chamber 106. In at least one embodiment, within the cylindrical chamber 106, there is an impeller assembly 108 having a plurality of impeller blades 112 rotatable about a central hub 114 and extending outwardly from the central hub 114. The pipe portion 104 has a fluid inlet 130 and a fluid outlet 132 and the cylindrical chamber 106 is in fluid communication with the pipe portion 104 and disposed between the fluid inlet 130 and the fluid outlet 132. In at least one embodiment, a controller (and or a power source) is operably coupled to the blade 112 to control the rotation of the blade 112. The blades 112 are configured to rotate about the hub 114 at a variable speed in response to the controller. Such a characteristic will be discussed in more detail in connection with FIG. 2.

In at least one embodiment, the impeller blades 112 are positioned in line with a fluid flow (e.g., in the direction of the block arrow shown) that enters from the pipe portion 104 and the cylindrical portion 106 through the fluid inlet 130. As such, at least a portion of the flow is transported through flowmeter 100 via the rotation of the blades 112.

Depending on the particular application involved, the number of impeller blades 112 implemented may vary based on the desired criteria of a particular implementation. A practical minimum number of the impeller blades 112 is three (3). In one embodiment, the number of impeller blades 112 is in a range independently selected from no less than 3, 5, 7, or 9, to no greater than 50, 40, 30, or 20.

The impeller blades 112 may be of any suitable shape and material. In at least one embodiment, and as shown in FIG. 1, the impeller blades 112 are of the same shape and construction within the impeller assembly 108 and spaced apart evenly along the direction of A-A of FIG. 1. Optionally, the impeller blades 112 may be made of resilient materials to absorb energy imparted by an incoming flow. The resilient material may include any one or more of soft rubber, soft plastics, thermoplastic polymers, and thermoset resins.

FIG. 2 schematically depicts a cross-sectional view of the impeller assembly 108 of FIG. 1. As shown in FIG. 2, the impeller blades 112 are attached to a permanent magnet 202 that is used in conjunction with a split electromagnet 204. The controller 203 applies an oscillating current to the split electromagnet 204 through connecting wires 206 to effectuate the rotation of the impeller blades 112 about the central hub 114 and a bearing surface 208.

Figure 1A:
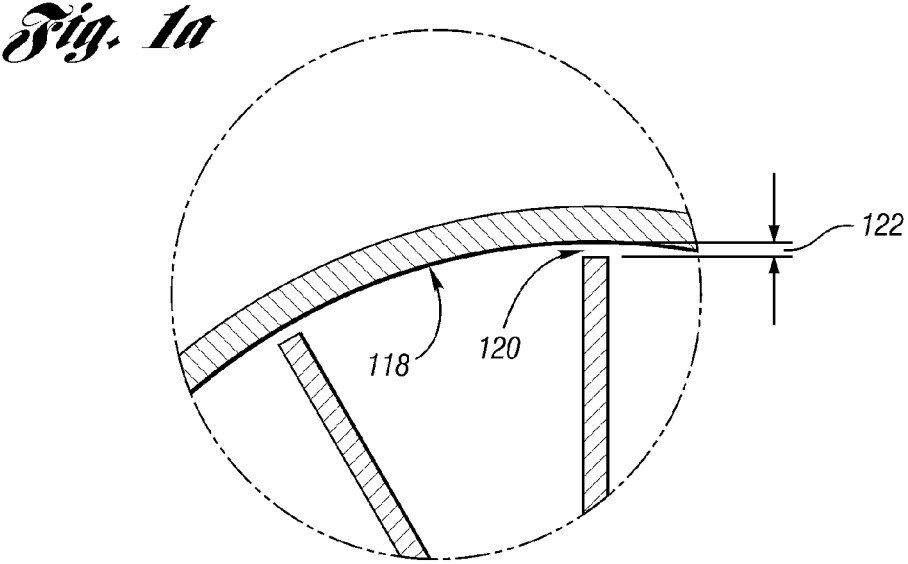
FIG. 1a shows a detailed view of an approach distance in the flowmeter of FIG. 1.

In at least one embodiment, and as illustrated in FIG. 1a, an outer periphery 120 of the impeller blade 112 is configured such that the outer periphery 120 does not contact an inner surface 118 of the cylindrical chamber 106, thereby defining an approach distance 122 between the outer periphery 120 and the inner surface 118 as shown in FIG. 2. Such an approach distance 122 may minimize contact friction otherwise in existence between the impeller blades 112 and the cylindrical chamber 106. It may be possible to remove the approach distance if certain anti-friction methods are employed. One exemplary method would be to apply ample amount of lubricant between the contacting surfaces of the impeller blades 112 and the cylindrical chamber 106. In the event the approach distance 122 is implemented such an approach distance 122 may be between 0.1% to 10% of the pipe diameter "D" of the pipe portion 104. In one particular embodiment, the approach distance 122 is between 0.5% to 5% of the pipe diameter "D". Any portion of a fluid that flows through the approach distance is identified as a bypass flow. In at least one embodiment, and as will be described below in more detail, a measurement of incoming flow rate of a fluid is obtained when the bypass flow through the approach distance is minimized or ceased.

Referring now back to FIG. 1, the pressure measuring component 110 includes a pressure sensor 134 and a sampling pipe 136. The sampling pipe 136 includes a sampling inlet 142 and a sampling inlet 144. The pressure sensing component 110 is in fluid communication with the pipe portion 104 through the sampling inlet 142 and the sampling inlet 144.

In reference to FIG. 4, the pressure sensor 134 is shown as a 2-sided configuration. The pressure sensor 134 has a pair of openings to receive the sampling fluid from both the sampling inlet 142 and the sampling inlet 144. With continuing reference to FIG. 4, a pressure sensitive membrane 402 is subject to the sampling fluid from both ends such that the membrane extension is capable of measuring the pressure differential. In another embodiment, two or more one-sided pressure sensor may be implemented such that a first one-sided pressure sensor measures the inlet pressure and a second one-sided pressure sensor measures the outlet pressure. With a one-sided pressure sensor implementation, such pressure sensors may adopt calibration prior to being implemented.

The pressure sensor 134 may be calibrated advantageously without having to run a fluid flow within the housing conduit 102. For example, the calibration may be conducted when both the pipe portion 104 and the cylindrical chamber 106 are devoid of any fluids and/or remain still. As such, costs due to wear and tear otherwise associated with conventional flowmeter calibration which requires an amount of fluid flow are now substantially reduced. In addition, the calibration process may not need to be repeated during a particular use of the flowmeter 100. Furthermore, the pressure sensing component 110 may be easily replaced after a certain period of use. Therefore, costs associated with construction, operation, and maintenance of the flowmeter 100 may be greatly reduced for the reasons stated above.

The housing conduit 102 may be constructed of various durable materials such as steel, copper, iron, thermoplastic polymer, thermoset polymer, or glass-fiber filled polymer to sustain the pressure inherent within the fluid being transferred. Depending on the type of pressure sensor 134 used, the sampling pipe 136 may be made of a material different from the material for the housing conduit 102.

In at least one embodiment, an incoming fluid flows within the pipe portion 104 from the fluid inlet 130 toward the fluid outlet 132. When the impeller assembly 108 is not powered and the blades 112 are not rotated, the incoming fluid is to flow as a bypass through the approach distance 122 and/or to pass through the cylindrical portion 106 by pushing the impeller blades 112 in the direction of A-A. In such a case, a pressure drop may be exhibited and is between the fluid in the inlet 130 and the fluid at the outlet 132. Such a pressure drop may be present because fluid energy is absorbed due to the counter resistance exerted by the impeller blades 112. In addition, the cross-sectional area (not shown) of the bypass flow, as defined by the approach distance 122, is comparably smaller than the cross-sectional area (not shown) of the pipe portion 104, and as such, a further drop of fluid pressure at the fluid outlet 132 results.

A stop valve 146 may be optionally installed on the sampling pipe 136 proximate to the sampling inlet 142. When the valve 146 is in an open position, pressure signals obtained from both the sampling inlets 142 and 144 are transmitted to the pressure sensor 134. A pressure differential of the fluid between the inlet and the outlet is measured by the pressure sensor 134. Consequently, the pressure differential is a negative value under the above stated circumstances.

Likewise, when the impeller speed "R" is at a value greater than Rb as indicated in FIG. 3, the pressure differential "Pi-Po" becomes a positive value. The value of the "Pi-Po" keeps increase as the impeller speed "R" increase and reaches a maximal positive value when the impeller speed "R" is at a maximal value.

In at least one embodiment, and as shown in FIG. 3, both the differential pressure "Pi-Po" varies, between a first pressure value and a second pressure value, in response to the impeller speed "R" that changes over time. The impeller speed "R" may be ascertained in its value through the use of a frequency-controlled variable speed motor or with an open-loop DC motor coupled with a shaft speed encoder. In one particular instance, the first pressure value is a positive value. In another particular instance, the second pressure value is a negative value.

In one embodiment, the impeller blades 112 rotate with a speed R cyclically variable over time. However, it is certainly operable that the speed R may vary in any suitable patterns such as a non-cyclical pattern, a random pattern, or an irregular pattern. The differential pressure reaches a maximum positive value when the impeller speed R is at its highest; likewise, the differential pressure reaches a maximum negative value when the impeller speed is at its lowest or substantially zero. The amplitude of change in differential pressure is a function of the cross-section area Ab of the approach distance 122. Specifically, smaller the Ab, more significant the amplitude "c" of differential pressure change.

In at least one particular embodiment, the flow rate of a fluid is determined when the pressure differential is at a pre-selected pressure value between the first and the second pressure values. In at least one particular embodiment, the pre-selected pressure value is substantially zero. Referring back to FIG. 3, at time point "a" where the pressure differential becomes substantially zero, the impeller speed R at the corresponding point "b" is used to calculate the bulk flow Gi at that particular time point "a". The flow measurement repeats over time and flow rate measurement that is independent of fluid property is made possible simply via measuring an impeller speed R whenever a corresponding pressure differential becomes substantially zero.

As the impeller assembly 108 is powered and the impeller blades 112 are forced to rotate in the direction of A-A, which is in line of the fluid flow, the pressure differential between the fluid inlet 130 and the fluid outlet 132 is accordingly minimized. More fluid flow is being recovered at the fluid outlet 132 and the pressure loss is alleviated. When a particular rotational speed is reached for the impeller blades 112, the volume displaced by the rotation of the impeller blades 112 over a period of time equals the incoming flow Gi, and the pressure differential becomes substantially zero.

As shown in equation (1)

$$P_i - P_o = \frac{L\rho v^2}{\sqrt{Ab}} \phi_2 \left( \frac{e}{\sqrt{Ab}}, \frac{\sqrt{Ab}\, v\rho}{\mu} \right) \quad (1)$$

whereas Pi is fluid inlet pressure measurable at the sampling inlet 142; Po is fluid outlet pressure measurable at the sampling inlet 144; L is the passage length (not shown) of the by pass flow or alternatively the radial thickness of each of the blades 112; $\rho$ is fluid density; e is flow surface roughness; $\phi_2$ is Fanning friction factor; $\mu$ is fluid viscosity; $v$ is the bypass flow velocity; and Ab is cross-sectional flow area of the approach distance 122. $v$ is determinable by the equation (2)

$$v = \frac{Gi - RVp}{Ab} \quad (2)$$

whereas Gi is the fluid's flow rate to be determined; R is the rotational speed of the blades 112; Vp is the wheel volume displaced by one full rotation of the impeller blades 112.

In order to determine the flow rate independently of state property and in this case, viscosity or density, equation (1) states that the right hand side becomes substantially zero and hence insensitive to viscosity or density when the bypass flow velocity $v$ is substantially zero and therefore no fluid passes through the approach distance 122. The value of $v$ now is substantially zero, in reference to equation (2) Gi=RVp. For the ease of identification, the value of rotational speed R when a pressure differential Pi-Po becomes substantially zero is designated as Rb. Therefore, the incoming flow rate Gi is calculated by multiplying Rb and Vp whereas Rb and Vp are each a measurable and identifiable value representing, as mentioned above, the impeller rotational speed and the wheel volume, respectively. Vp is defined as a flow volume displaced by one full rotation of the blades 112; alternatively, Vp can be calculated as the sum of all the annular volume Vb having a cross-section illustrated as the shaded area of FIG. 1 and the shaded area is defined as the area between the inner surface of the cylindrical portion 106 and the two adjacent impeller blades 112. It is noted that because the incoming flow rate Gi is calculable from RbVp when the pressure differential "Pi-Po" becomes substantially zero, the measure of Gi is independent of the properties of the fluid, more particularly independent of fluid viscosity or density that may change over time as being contaminated during fuel cell operation. In addition, the bypass flow at the approach distance 122 may not be needed for the measurement of the bulk flow Gi. A structural seal may not be needed at the approach distance 122 so that maintenance cost is reduced accordingly.

In operation, a readout of the rotational speed R of the impeller assembly 108 and a corresponding pressure readout of the pressure sensor 134 may be combined as a data input to a computerized processor (not shown) and a data output of the processor may be directly reported as a value for the incoming flow rate Gi. As such, the entire process of measuring the flow rate Gi of an incoming fluid may be automated.

In at least one aspect of the invention, a flowmeter such as the flowmeter of FIG. 1 is used to determine a state property $\delta$ of a fluid. The application of the flowmeter in measuring the state property $\delta$ is particularly useful when the fluid is a multi-phase mixture—a situation often true when one source of fluid is combined with another or when the fluid is contaminated as the fluid flows through. The state property δ of a fluid illustratively includes fluid temperature, fluid pressure, and concentration of each particulate species contained within the fluid.

The fluid viscosity ρ or density μ is related to the state property $\delta_n$ by equations $\rho = f_a(\delta_1, \delta_2, \ldots)$ and $\mu = f_b(\delta_1, \delta_2, \ldots)$, whereas $\delta_1$ and $\delta_2$ each represents a particular state property. The correlations are inserted into equation (1) to result in the following:

$$P_i - P_o = \tag{3}$$
$$\frac{Lf_a(\delta_1, \delta_2, \ldots)v^2}{\sqrt{Ab}} \phi_2\left(\frac{e}{\sqrt{Ab}}, \frac{\sqrt{Ab}\,vf_a(\delta_1, \delta_2, \ldots)}{f_b(\delta_1, \delta_2, \ldots)}\right)$$

$$v = \frac{Gi - RVp}{Ab} = \frac{(Rb - R)Vp}{Ab} \tag{4}$$

$$P_i - P_o = \frac{Lf_a(\delta_1, \delta_2, \ldots)(Rb-R)^2 Vp^2}{Ab^{2.5}} \tag{5}$$
$$\phi_2\left(\frac{e}{\sqrt{Ab}}, \frac{\sqrt{Ab}(Rb-R)Vpf_a(\delta_1, \delta_2, \ldots)}{Abf_b(\delta_1, \delta_2, \ldots)}\right)$$

$$\therefore P_i - P_o = f_c(R, Rb, \delta_1, \delta_2, \ldots) \tag{6}$$

As stated in the equation (4) above, Rb is the rotational speed of the impeller blades 112 when a differential pressure becomes substantially zero, as such, Rb is a given. According to equation (6), any one state property δ such as $\delta_1$ is computable from a changing pattern between "$P_i$-$P_o$" and R, as the remaining δ such as $\delta_2$ is known or held constant.

In at least one embodiment, a pattern of changes between pressure differential "Pi-Po" and rotational speed R relative to a particular state property may be constructed and stored in a look-up table. The look up table may include information regarding a test fluid which includes known or constant values in state properties such as $\delta_1$, $\delta_2$, and $\delta_3$, flows through the flowmeter 100 via fluid inlet 130. A rotational speed Rb when pressure differential "Pi-Po" becomes substantially zero is measurable with respect to $\delta_1$. According to equation (6) and Rb is a given, Pi-Po changes accordingly with R, and a first pattern of changes between "Pi-Po" and R with regard to $\delta_1$ is generated using the flowmeter. Then $\delta_1$ is changed to a new known value $\delta_1'$ while all the remaining state properties stay unchanged. As a result, a rotational speed Rb' when pressure differential "Pi-Po" becomes substantially zero is again measurable using the flowmeter 100 as described above. Since now Rb' is known and according to equation (6), a second pattern of changes between Pi-Po and R with regard to $\delta_1$ is generated. This process repeats so that it is possible to record patterns of changes in response to variations in the value of one state property $\delta_1$ is generated in order to develop the look-up table.

The test fluid upon which the look-up table is based is now replaced with a sample fluid. The sample fluid is similar to the test fluid except that the corresponding value of the state property $\delta_1$ is unknown and needs to be measured for the sample fluid. In this case, when the sample fluid passes through the flowmeter 100 through the fluid inlet 130 and the values of Pi-Po, R, and Rb relevant to the sample fluid are measured through the operation of the flowmeter 100, the corresponding value of the sample state property δ is ascertained by referring to the look-up table. It is understood that any other state properties of the fluid may be determined by the method described herewith as long as a corresponding look-up table is similarly constructed that is pertinent to the state property at issue. It is also understood that all the data entries within the look-up table are translatable to a computerized algorithm whereby a user determines a particular state property of a sample fluid via data inputs to the algorithm.

While particular embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A flowmeter for determining a flow rate of a fluid having a plurality of state properties, the flowmeter comprising:
   a housing conduit having an inlet, an outlet, and a cylindrical chamber, the cylindrical chamber being interposed between the inlet and the outlet;
   an impeller assembly positioned within the cylindrical chamber for rotation, wherein the impeller assembly is operably coupled to a controller to facilitate the rotation of the impeller assembly at a variable speed such that a pressure differential of the fluid between the inlet and the outlet varies between a first pressure value and a second pressure value in response to the variable speed of the impeller assembly; and
   a pressure sensor fluidly coupled to the housing conduit and configured to measure the pressure differential of the fluid at a preselected pressure value that is between the first and second pressure values to determine the flow rate of the fluid independent of at least one state property of the fluid.

2. The flowmeter of claim 1, wherein the first pressure value is a positive value.

3. The flowmeter of claim 1, wherein the second pressure value is a negative value.

4. The flowmeter of claim 1 wherein the preselected pressure value is substantially zero.

5. The flowmeter of claim 1, wherein the variable speed is cyclical over time.

6. The flowmeter of claim 1, wherein the impeller assembly includes a central hub and a plurality of blades extending outwardly about the central hub, wherein the plurality of blades are rotatable about the central hub in response to the controller.

7. The flowmeter of claim 6, wherein the plurality of blades are rotatable in line with the flow of the fluid such that at least a portion of the flow of the fluid rotates through the blades.

8. The flowmeter of claim 6, wherein an approach distance is maintained between an outer periphery of each blade and an inner surface of the cylindrical chamber.

9. The flowmeter of claim 8, wherein the approach distance is from 0.5 to 5 percent of an inlet diameter of the housing conduit.

10. The flowmeter of claim 6, wherein the blades are resilient to absorb energy imparted by the fluid flow such that counter resistance of the blades relative to the fluid flow is reduced.

11. A flowmeter system for measuring a flow rate of a fluid having a plurality of state properties in a fuel cell vehicle, the flowmeter comprising:
   a housing conduit having an inlet, an outlet, and a cylindrical chamber, the cylindrical chamber being interposed between the inlet and the outlet;
   an impeller assembly positioned within the cylindrical chamber for rotation within the cylindrical chamber;

a power source operably coupled to rotate the impeller assembly at a variable speed such that a pressure differential of the fluid between the inlet and the outlet varies between a first pressure value and a second pressure value in response to the variable speed of the impeller assembly; and a pressure sensor fluidly coupled to the housing conduit and configured to measure the pressure differential of the fluid at a preselected pressure value that is between the first and second pressure values to determine the flow rate of the fluid independent of at least one state property of the fluid.

12. The flowmeter system of claim 11, wherein the first pressure value is a positive value.

13. The flowmeter system of claim 11, wherein the second pressure value is a negative value.

14. The flowmeter system of claim 11 wherein the preselected pressure value is substantially zero.

15. The flowmeter system of claim 11 wherein the impeller assembly includes a central hub and a plurality of blades extending outwardly about the central hub, wherein the plurality of blades are rotatable about the central hub in response to the controller.

16. The flowmeter system of claim 15, wherein the plurality of blades are rotatable in line with the flow of the fluid such that at least a portion of the flow of the fluid rotates through the blades.

17. The flowmeter system of claim 15, wherein an approach distance is maintained between an outer periphery of each blade and an inner surface of the cylindrical chamber.

18. The flowmeter system of claim 17 wherein the approach distance is between 0.5 to 5 percent of an inlet diameter of the housing conduit.

19. The flowmeter system of claim 15 wherein the blades are resilient such that counter resistance of the blades relative to the fluid flow is reduced.

20. A process for measuring a targeted state property of a sample fluid, the process comprising:

providing a housing conduit having an inlet, an outlet, and a cylindrical chamber, the cylindrical chamber being interposed between the inlet and the outlet and having an impeller assembly positioned within the cylindrical chamber for rotation;

subjecting a test fluid to the housing conduit through the inlet, the test fluid having a known value as to the targeted state property;

rotating the impeller assembly at a variable speed (R) and measuring a corresponding pressure differential (Pi-Po) of the test fluid between the inlet and the outlet to form a pattern of changes between the R and the Pi-Po;

repeating the steps of subjecting and rotating to form patterns of changes between the R and the Pi-Po with respect to each different known value of the targeted state property and to construct a look-up table showing the patterns of changes;

contacting the housing conduit with the sample fluid through the inlet;

varying the R and measuring corresponding Pi-Po to form a pattern of changes between the R and the Pi-Po relative to the sample fluid; and determining the targeted state property of the sample fluid by comparing the pattern of changes of the sample fluid to the look-up table.

\* \* \* \* \*